(12) United States Patent
Müller et al.

(10) Patent No.: US 7,070,096 B2
(45) Date of Patent: Jul. 4, 2006

(54) PORTABLE LIQUID DISPENSING STATION

(76) Inventors: Rudolf Müller, Česká 69, 66431 Česká u Brna (CZ); Miroslav Žerdík, Čs. Exilu 479, 70800 Ostrava (CZ)

( * ) Notice: Subject to any disclaimer, the term of this patent is extended or adjusted under 35 U.S.C. 154(b) by 157 days.

(21) Appl. No.: 10/481,717

(22) PCT Filed: Jun. 17, 2002

(86) PCT No.: PCT/CZ02/00037

§ 371 (c)(1),
(2), (4) Date: Feb. 17, 2004

(87) PCT Pub. No.: WO03/000584

PCT Pub. Date: Jan. 3, 2003

(65) Prior Publication Data

US 2004/0164144 A1 Aug. 26, 2004

(30) Foreign Application Priority Data

Jun. 22, 2001 (CS) .............................. 2001-2315

(51) Int. Cl.
*G06F 7/08* (2006.01)
(52) U.S. Cl. .................. 235/381; 222/23; 222/132; 222/608
(58) Field of Classification Search ................ 235/381
See application file for complete search history.

(56) References Cited

U.S. PATENT DOCUMENTS

| | | | | |
|---|---|---|---|---|
| 3,257,031 A | * | 6/1966 | Dietz | 222/23 |
| 3,814,148 A | * | 6/1974 | Wostl | 141/98 |
| 4,520,717 A | * | 6/1985 | Bohrer et al. | 99/337 |
| 4,911,330 A | * | 3/1990 | Vlaanderen et al. | 222/132 |
| 4,988,020 A | * | 1/1991 | Webb | 222/608 |
| 5,865,346 A | | 2/1999 | Dell Zotto | |
| 5,983,962 A | * | 11/1999 | Gerardot | 141/231 |
| 6,216,790 B1 | | 4/2001 | Webb | |
| 6,573,884 B1 | * | 6/2003 | Kinzie | 345/156 |

FOREIGN PATENT DOCUMENTS

| | | |
|---|---|---|
| DE | 4415964 | 11/1995 |
| EP | 0507690 | 10/1992 |
| WO | WO 9801330 | 1/1998 |

* cited by examiner

*Primary Examiner*—Thien M. Le
*Assistant Examiner*—Daniel A. Hess
(74) *Attorney, Agent, or Firm*—Ladas & Parry LLP

(57) ABSTRACT

As a mobile equipment for supplying fuels, serving also for storing and purchase of other kinds of liquids, like drinking water etc., there is designed a liquid dispensing station provided with dispensing system, pumping equipment and an operation unit having a control unit and card handling system. All the accessories are located in a common housing (1) comprising a frame with a jacket, having at least vertical walls (12) reinforced with at least two longitudinal beams (13) and at least two transversal beams (14). The tank (5) is attached to a bottom part of the frame (10) by way of a pair of holders (15) and a pair of feet (16), both pairs being mutually diagonally arranged. The feet (15) are furnished with system for resilient seat of the tank (5). Within the housing (1), adjacent to the tank (5), there are located module (2) of hydraulics, intake module (3) and module (4) of electronics. The modules (2,3,4) having face panels (20,30,40) arranged at one of the vertical walls (12), are preferably designed as slide removable units. The housing (1) is at least above the tank (5) provided with a removable roof (18). The module (2) of hydraulics is provided with dispensing system including a hand-held nozzle (21) with a hose.

8 Claims, 2 Drawing Sheets

PORTABLE LIQUID DISPENSING STATION

FIELD OF THE INVENTION

The invention relates to a mobile liquid dispensing station, especially for fuels, furnished with dispensing means, pumping equipment and an operation unit having a control unit and payment card handling means.

BACKGROUND OF THE INVENTION

The currently existing petrol stations are equipped with subterranean tanks the volume of which amounts to cubic metres, and further comprise servicing stands or stands with dispensing means. Customers, motor vehicle drivers, usually in a self-service mode, fill their car tanks with a desired volume of fuel and on a display they find a respective unit price, total quantity of taken fuel and a resulting price to be paid for that quantity. Than they are to pay the displayed price at the station cash desk. The described standard type of petrol stations needs a construction of subterranean tanks, inclusive necessary arrangements against fuel leakage and resulting contamination of ambient soil. The system also needs personnel to serve the station, at least at the cash desk. In most cases the stations operate the whole day through and therefore quite a large staff is necessary. Different situation occurs when it is necessary to open a temporary station, e.g. at a diversion road, when a current filling station is not available or not accessible and the next one is far away. Such a problem cannot be satisfactory removed by current standard means. There is known a mobile fuel station described in a paper PCT CZ 00/00061 which is furnished with a service stand comprising dispensing means and an operation unit which is provided with payment card handling means and a data transmission block. The arrangement described in the paper does not solve the problem of transport and installation of such a station. It is a common practice that a transport housing has to meet respective standards and regulations and in a case of a fuel tank such regulations, especially those regarding safety, are very strict and demanding.

It is an object of the invention to design a liquid dispensing station enabling safe transport, facilitating installation and removal and allowing for uninterrupted and safe operation of the station and any site.

DISCLOSURE AND OBJECT OF THE INVENTION

The foregoing problems are solved and the above presented object is achieved by a mobile liquid dispensing station furnished with dispensing means, pumping equipment and an operation unit having a control unit and payment card handling means, all the accessories being located in a common housing. The station in an embodiment according to the invention comprise the housing which has a frame with a jacket, of which at least vertical walls are reinforced with at least two longitudinal beams and at least two transversal beams and a bottom part of which supports the tank. Within the housing, adjacent to the tank, there are located module of hydraulics, intake module and module of electronics, the modules having face panels arranged at one of the vertical walls of the housing. Farther according to the invention the tank, preferably of a cubic shape, is attached to the bottom part of the frame by means of a pair of holders and a pair of feet, both pairs being mutually diagonally arranged, provided the feet are furnished with means for resilient seat of the tank. In a preferred embodiment the housing is at least above the tank provided with a removable roof. Still further in accordance with the invention the module of hydraulics and/or intake module and/or module of electronics are designed as slide removable units. In another preferred embodiment the module of hydraulics is provided with dispensing means including a hand-held nozzle with a hose. The module of electronics is preferably provided with a control unit, a data transmission block and a card handling equipment which is furnished with means for reading a card and recording into the card. For further improvement of provided service the module of electronics may be provided with a voice unit with a microphone and a loudspeaker. To improve a safety of operation housing should be provided with an automatic operating extinguisher.

The above solution offers a facility operating fully on a self-service base needing no regular staff, the said facility allowing for installation of a liquid dispensing station at any place of current need without excessive investment costs. Construction of the housing and the tank together with a modular design of mechanical and electronic components provides for a large variety of supplied liquids, from water to fuels. All information may be presented to a client both in an optic and in an acoustic manner. The tank allows for transportation in empty as well as in filled state. The station of the art may serve any owner of a special or a current payment card, according to arrangement of each station.

BRIEF DESCRIPTION OF THE DRAWINGS

The invention is further illustrated by way of an example presented in the accompanying drawings.

DESCRIPTION OF A PREFERRED EMBODIMENT

Figure 1:
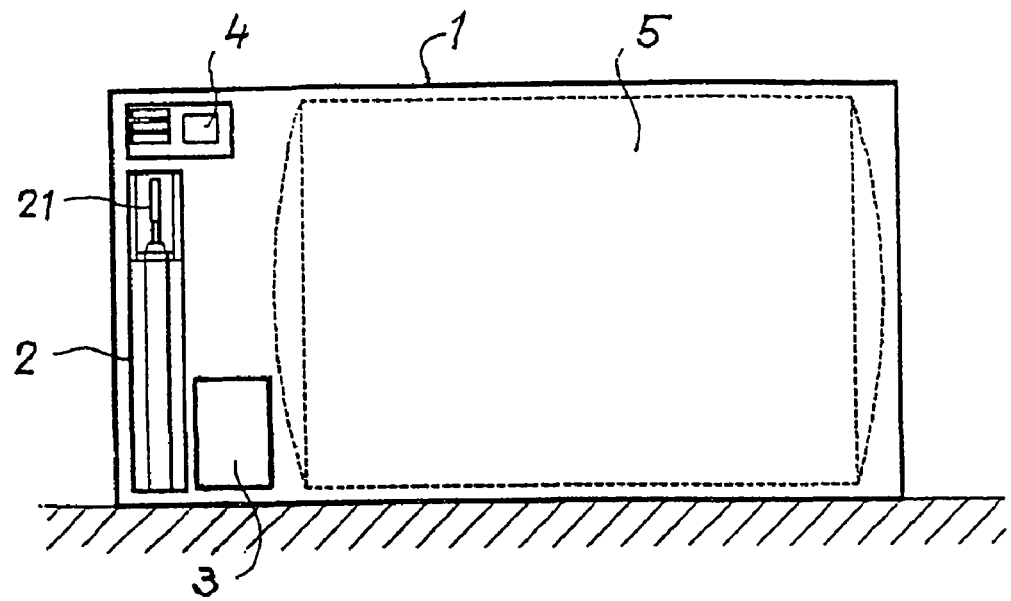
FIG. 1 presents a front elevation view of a preferred embodiment of the station and FIG. 2 shows a front elevation view on the station in a partial cross-section and FIG. 3 offers a block diagram of an operation unit.
Figure 2:
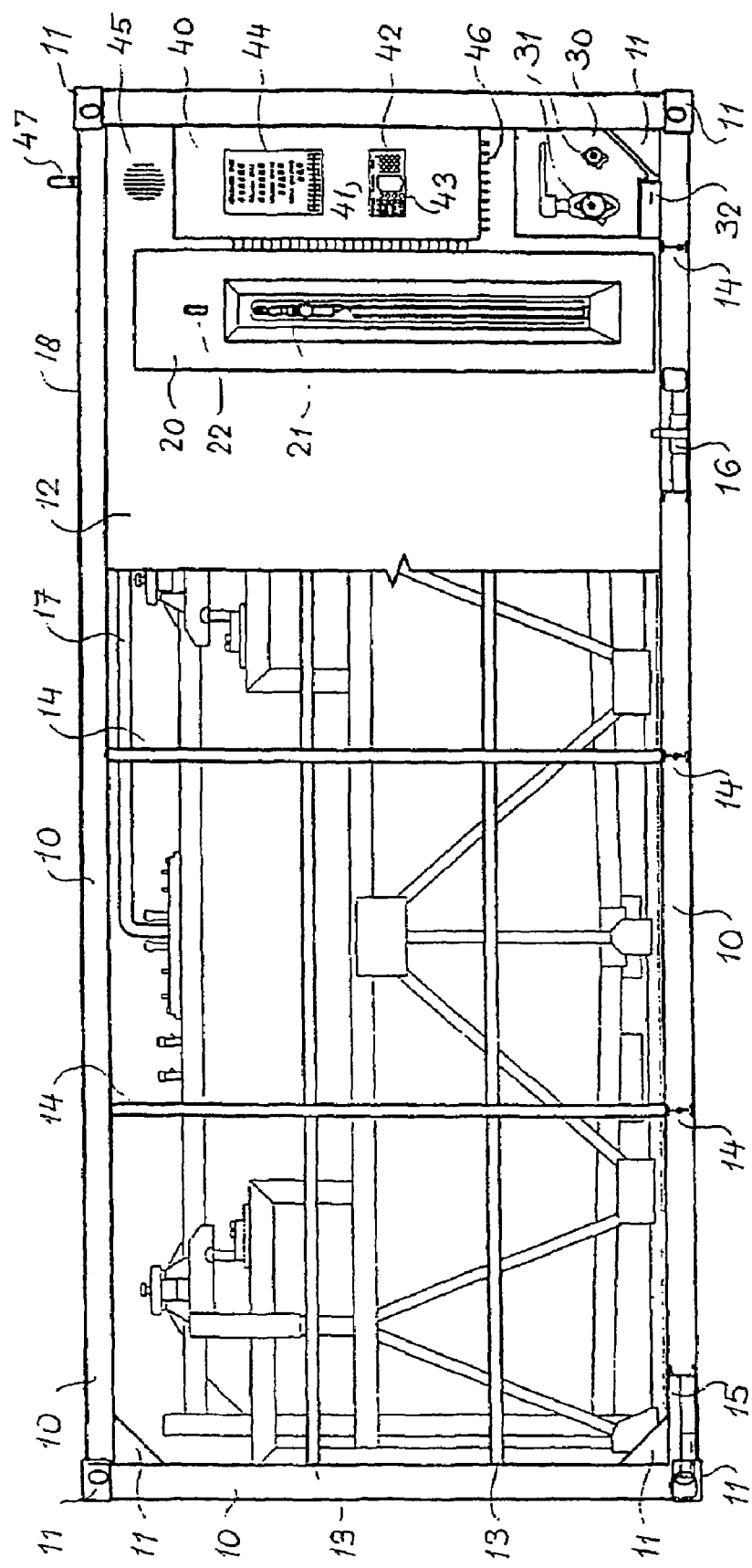

As presented in FIG. 1, the liquid dispensing station comprise a single housing 1, inside which there are arranged a module 2 of hydraulics with dispensing means and pumping equipment, an intake module 3, a module 4 of electronics and a tank 5. With respect to necessary mechanical rigidity the housing 1, as can be seen from FIG. 2, is constructed as a rigid frame enclosed by a jacket. The frame consists of supports 10, which are in corners fixed together and stiffened by corner pieces 11. All vertical walls 12 of the jacket are reinforced by longitudinal beams 13 and transversal beams 14. In the depicted embodiment there are used two longitudinal beams 13 and two transversal beams 14. In the corners of a bottom part of the frame there are attached holders 15 and feet 16 securing the tank 5. The frame bottom part is also reinforced by longitudinal and transversal beams 13,14. All the said parts of the frame, the supports 10, corner pieces 11, longitudinal and transversal beams 13,14, holders 15 and feet 16 are mutually interconnected, preferably by welding, into a single rigid body.

The tank 5, having a cubical shape to achieve a maximum volume available for storing a liquid, is secured within the frame in four corner points. Two of them are diagonally arranged holders 15, the other two are the feet 16, furnished with means for a resilient seat of the tank 5, the said means minimising transfer of the frame deformation upon the tank 5. Such a tank attachment, together with the above described design of the housing 1, allows for an embodiment having outer dimensions according to the Standard ISO 668 and meeting requirements of the Standards ISO 1496 and ISO 1161, thus providing for easy transport of a complete station transfer The tank 5 is inside furnished with perforated partition walls significantly reducing pressure impulses of a stored liquid upon the tank 5 walls during transports. The tank 5 bottom is inclined towards its centre. In the upper part of the housing 1 there are located pipes 17 for intake and dispensation of a liquid and for ventilation of the tank 5 inner space. A particular design of a tank 5 depends upon a type of a stored liquid. The tank 5 construction allows for transport both in empty and filled state.

The tank 5 jacket comprise a removable roof 18 as a part of the frame upper deck. The said roof 18 facilitates installation of the tank 5 within the frame and subsequently its inspection and maintenance. The roof 18 may cover completely the upper surface of the housing 1 or only a part of it. Anyhow, the roof 18 shall be a part of the frame jacket at least in the area above the tank 5.

At one of the vertical walls 12, on the front wall as depicted on FIG. 2, there are arranged a panel 20 of the module of hydraulics, a panel 30 of the intake module and a panel 40 of the module of electronics. Each of the modules 20,30,40 is designed as a slide removable unit, thus facilitating maintenance, repairs and replacement of any unit if necessary. Design and construction of each of the modules 20,30,40 depends upon a particular liquid stored in and dispensed from the tank 5.

The module 2 of hydraulics, apart from the dispensing means including a hand-held type nozzle 21 and a hose, contains all equipment for handling a liquid stored in the tank 5 and allows for controlled and measured intake and dispensing of the liquid. The hand-held type nozzle 21 serves for dispensing of the liquid directly into a cistern of a customer. Flow indicator 22 shows circulation of a liquid when dispensed through the nozzle 21. A service stand commonly used at standard petrol stations does not exist by the station according the invention.

The intake module 3 serves for replenishment of the tank 5. Intake fittings 31 provide for a safe and controlled flow of a liquid into the tank 5. The intake module 3 is equipped with a closing lid with a lock 32.

The station is controlled by means of control elements, located at the front panel 40 of the module 4 of electronics. The front panel 40 offers a card unit 41, push-buttons 42 for setting a card identification code for a cashless payment for a tanked liquid and also emergency-call pushbuttons 43. Any payment is carried out by a credit card placed within an identified space in the front panel 40. All information necessary for handling a liquid dispense appear on a display 44. To improve a communication of a client with the station there is available a built-in voice unit 45 with a microphone and a loudspeaker. Ventilation openings 46 ensure safe operation of the module 4 of electronics in a case any fuel is tanked. GSM antenna, located at the housing 1 upper deck provide for transfer of all control and information data within the control system of a network of mobile liquid dispensing stations.

Figure 3:
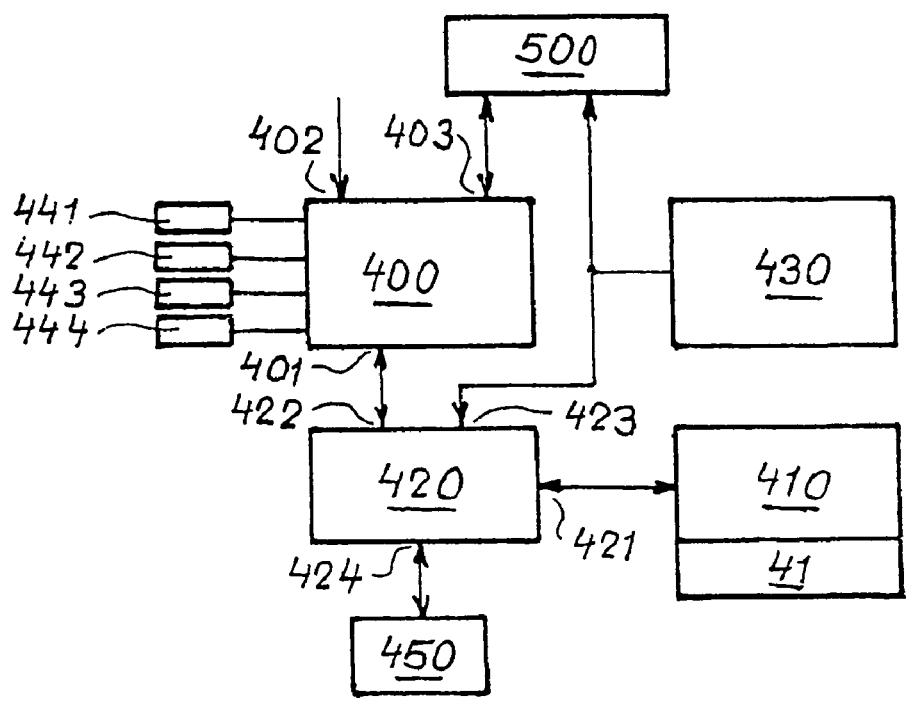

The module 4 of electronics is provided with a measurement unit 400, a card handling equipment 410, a control unit 420, a parameter watching block 430 and a data transmission block 500. As seen on FIG. 3, on outputs of the measurement unit 400 there are connected a unit price display 441, a total tanked quantity display 442, a final price display 443 and a card balance display 444.

The control unit 420, preferably equipped with a processor, is provided with four ports. On the first port 421 there is connected the card handling equipment 410, the second port 422 is connected to the measurement unit 400, the third port 423 is connected to the output of the parameter watching block 430 and the fourth port 424 is connected to a pump control block 450.

The measurement unit 400 has a port 401 for communication with the control unit, a tank content signal input 402 and a data transmission port 403. The data transmission port 403 and the parameter watching block 430 output are connected to the respective inputs of the data transmission block 500.

The housing 1 of a station for supplying flammable liquids, such as gasoline, petrol, oils etc., is further furnished with an automatic extinguisher placed, which is placed inside, in the vicinity of the intake module 3 and the module 2 of hydraulics. The extinguisher is not shown on the drawings. Undesired leakage of liquids of this type in a case of a breakdown of the tank 5 or any equipment within the intake module 3 or the module 2 of hydraulics, is prevented by a leakage-proof jacket of the housing 1 frame. Undesired appearance of the liquid during any stage of the station transport is monitored by special sensors, operating on a principle of photon loss on a boundary surface of media with different indices of refraction. Such a sensor equipment, known as such, is not depicted on the drawings.

Power supply is galvanic separated from a power distribution network and has its own protection by grounding at a site. An accumulator serves as a time-limited stand-by source in a case of any power network failure. To increase a mobility of the station a single-phase supply is preferred.

The station operates as follows:

To be served from a station according to the invention a customer needs a credit card, such as "an electronic purse", i.e. a card with a contactless data sensing. The card is inserted into the card unit 41, which is a part of the card handling equipment 410, where an authorisation of the card is performed. In a case an improper card or a card with a zero credit is inserted, any liquid collection is blocked by a signal from the fourth port 424 of the control unit 420. To the contrary, after acceptance of the card and its non-zero credit, the dispensing means shall become available and the customer may collect any amount of the liquid up to the volume corresponding to existing credit on the card. Proportionally to the tanked volume of the liquid the card credit shall be reduced down to a zero value, when any further tanking shall be automatically stopped. The price for the tanked liquid volume shall be subtracted from card credit sum and the resulting value entered into the card by means of the card handling equipment 410. Start and stop of the tanking process by the customer is carried out by a standard procedure by means of the hand-held nozzle 21, the construction of which is known as such. The signal for blocking a pump may be sent to the pump control block 450 also from one of the control unit 420 outputs.

The parameter watching block 430 monitors such parameters as volume of liquid inside the tank 5, its temperature etc. As the block also monitors any manipulation with the station, any stealing or unauthorised transfer of the station to another site should be prevented. All acquired data are continuously or in pre-set time-intervals automatically transferred to the headquarters, which collects data from all liquid dispensing stations.

By means of the data transmission block 500 it is possible to enter actual prices of the particular liquid into the module 4 of electronics, namely into the measurement unit 400.

Application of contactless cards and sensors capable not only to read cards but also make records into the cards, eliminates authorisation of cards by means of a modem connected to a permanent telephone line. All on-line control and off-line information transmissions are performed wireless, by means of GSM, UMTS, FVA or other networks. Such systems ensure fast installation of the station also on sites where standard telephone network is not available.

INDUSTRIAL APPLICATIONS

The liquid dispensing station is designed for mobile equipment for supplying fuels, but may be used also as means for storing and purchase of other kinds of liquids, like drinking water etc.

The invention claimed is:

1. A portable liquid dispensing station, especially for fuels, furnished with dispensing means, pumping equipment and an operation unit having a control unit and payment card handling means, all the accessories being located in a common housing, that the housing comprises a frame with a jacket, having at least vertical walls reinforced with at least two longitudinal beams and at least two transversal beams and a bottom part of the frame supporting the tank, provided that within the housing, adjacent to the tank, there are located module of hydraulics, intake module and module of electronics, the modules having face panels arranged at one of the vertical walls of the housing; wherein the tank is attached to the bottom part of the frame by means of a pair of holders and a pair of feet, both pairs being mutually diagonally arranged, provided the feet are furnished with means for resilient seat of the tank.

2. A portable fuel station according to claim 1, wherein the tank is of a cubic shape.

3. A portable fuel station according to claim 1, wherein the module of hydraulics and/or intake module and/or module of electronics are designed as slide removable units.

4. A portable fuel station according to claim 1, wherein the housing is at least above the tank provided with a removable roof.

5. A portable fuel station according to claim 1, wherein the module of hydraulics is provided with dispensing means including a hand-held nozzle with a hose.

6. A portable fuel station according to claim 1, wherein the module of electronics is provided with a control unit, card handling equipment, the equipment being furnished with means for reading a card and recording into the card, the module of electronics being further provided with a data transmission block.

7. A portable fuel station according to claim 1, wherein the module of electronics is provided with a voice unit with a microphone and a loudspeaker.

8. A portable fuel station according to claim 1, wherein the housing is provided with an automatic operating extinguisher.

* * * * *